United States Patent
Forenz et al.

(10) Patent No.: US 11,318,717 B2
(45) Date of Patent: May 3, 2022

(54) METHODS OF FORMING LAMINATED GLASS STRUCTURES

(71) Applicant: Corning Incorporated, Corning, NY (US)

(72) Inventors: Dominick John Forenz, Hammondsport, NY (US); Michael William Price, Corning, NY (US); Mary Rosettie, Corning, NY (US); Eric Joseph Teator, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/117,055

(22) PCT Filed: Feb. 5, 2015

(86) PCT No.: PCT/US2015/014543
§ 371 (c)(1),
(2) Date: Aug. 5, 2016

(87) PCT Pub. No.: WO2015/120109
PCT Pub. Date: Aug. 13, 2015

(65) Prior Publication Data
US 2017/0165871 A1 Jun. 15, 2017

Related U.S. Application Data

(60) Provisional application No. 61/937,133, filed on Feb. 7, 2014.

(51) Int. Cl.
*B32B 17/10* (2006.01)
*B32B 7/14* (2006.01)
(Continued)

(52) U.S. Cl.
CPC ............ *B32B 17/10* (2013.01); *B24B 9/10* (2013.01); *B28D 1/02* (2013.01); *B28D 1/04* (2013.01);
(Continued)

(58) Field of Classification Search
CPC .. B28D 1/04; B28D 1/228; B28D 1/22; B24B 9/10; B24B 9/08; B24B 1/00;
(Continued)

(56) References Cited

U.S. PATENT DOCUMENTS 1,805,457 A * 5/1931 Haselton ............... C03B 33/078
225/94
3,089,801 A 5/1963 Tierney et al.
(Continued)

FOREIGN PATENT DOCUMENTS

| CN | 1271646 A | 11/2000 |
|---|---|---|
| CN | 1083763 C | 5/2002 |

(Continued)

OTHER PUBLICATIONS

Grit Size Comparison Chart, 2017, Victory Hardware Co (Year: 2017).*
(Continued)

*Primary Examiner* — Monica S Carter
*Assistant Examiner* — Abbie E Quann

(57) ABSTRACT

A method of field shaping a laminated glass structure is provided. The method includes providing the laminated glass structure comprising a flexible glass sheet having a thickness of no greater than about 0.3 mm laminated to a non-glass substrate by an adhesive material. The laminated glass structure is field cut using a handheld power tool thereby forming a shaped laminated glass structure. An edge strength of a cut edge of the shaped laminated glass structure at least about 20 MPa.

15 Claims, 7 Drawing Sheets

(51) Int. Cl.
*B24B 9/10* (2006.01)
*C03B 33/07* (2006.01)
*B28D 1/02* (2006.01)
*B28D 1/22* (2006.01)
*B28D 1/18* (2006.01)
*B28D 1/04* (2006.01)
*B28D 7/02* (2006.01)

(52) U.S. Cl.
CPC .............. *B28D 1/18* (2013.01); *B28D 1/183* (2013.01); *B28D 1/22* (2013.01); *B28D 7/02* (2013.01); *B32B 7/14* (2013.01); *C03B 33/078* (2013.01)

(58) Field of Classification Search
CPC ......... B24B 9/065; B24B 23/02; B24B 27/06; B24B 27/0666; B24B 27/065; B24B 27/08; B24B 27/0675; C03B 33/01; C03B 33/078; C03B 33/105; C03B 33/107; B32B 17/10; B32B 7/14
USPC ............... 451/41, 44, 29–31, 43, 65, 63, 70; 125/13.01
See application file for complete search history.

(56) References Cited

U.S. PATENT DOCUMENTS

| | | | |
|---|---|---|---|
| 3,338,696 | A | 8/1967 | Dockerty |
| 3,682,609 | A | 8/1972 | Dockerty |
| 4,196,760 | A * | 4/1980 | McDaniel ............... B23Q 3/002 144/116 |
| 4,428,159 | A * | 1/1984 | Sigetich ................. B28D 1/047 125/13.03 |
| 4,592,261 | A | 6/1986 | Miyaji et al. |
| 8,486,535 | B1 | 7/2013 | Nemeth et al. |
| 8,721,392 | B2 * | 5/2014 | Brown .................... B24B 9/102 451/44 |
| 2001/0051490 | A1 * | 12/2001 | Siders ................. B24B 27/0076 451/5 |
| 2002/0000292 | A1 * | 1/2002 | Habeck ................. C03B 33/107 156/270 |
| 2008/0301953 | A1 * | 12/2008 | Cogswell ............... B23D 45/08 30/371 |
| 2011/0081542 | A1 | 4/2011 | Pilloy et al. |
| 2011/0318994 | A1 | 12/2011 | Darcangelo et al. |
| 2012/0034435 | A1 | 2/2012 | Borrelli et al. |
| 2012/0052302 | A1 * | 3/2012 | Matusick ................ C03C 15/00 428/410 |
| 2012/0302139 | A1 * | 11/2012 | Darcangelo ............... B24B 9/08 451/36 |
| 2013/0220090 | A1 * | 8/2013 | Kuo ........................ B23D 61/02 83/23 |
| 2013/0258438 | A1 | 10/2013 | Sbar et al. |
| 2014/0109365 | A1 * | 4/2014 | Sutton ................ B29D 99/0025 29/23.51 |
| 2014/0170388 | A1 * | 6/2014 | Kashima ................. C03C 19/00 428/157 |

FOREIGN PATENT DOCUMENTS

| | | |
|---|---|---|
| JP | 2010205405 A | 9/2010 |
| KR | 2013-0135842 A | 12/2013 |
| WO | 2010126977 A1 | 11/2010 |
| WO | 2012/027133 A2 | 3/2012 |

OTHER PUBLICATIONS

Shemilt, "Mechanical processing of copper-clad laminates", Circuit World, vol. 1, No. 4, Jul. 1975, pp. 9-12.
Schimmel, "Economic Machining of GRP Laminates", Industrial Diamond Review, vol. 42, No. 493, Jun. 1982, pp. 348-349.
Subbiah, "Drilling holes in CFRP composite laminates using a router tool", (Conference Paper), Division of Manufacturing Engineering, School of Mechanical and Aerospace Engineering, Nanyang Technological University, Singapore, Singapore.
Gillespie, "The "Route" to Fine Finishes", Cutting Tool Engineering, vol. 60, Issue 6, Jun. 2008, pp. 26-27.
PCT International Search Report and Written Opinion, PCT/US2015/014543, dated May 22, 2015.
EP15746585 Search Report dated Jul. 28, 17, 4 Pages; European Patent Office.
Korean Patent Application No. 10-2016-7024341, Office Action dated Apr. 29, 2021, 9 pages (4 pages of English Translation and 5 pages of Original Document); Korean Patent Office.

* cited by examiner

METHODS OF FORMING LAMINATED GLASS STRUCTURES

CROSS-REFERENCE TO RELATED APPLICATIONS

This application claims the benefit of priority under 35 U.S.C. § 371 of International Patent Application Serial No. PCT/US15/14543, filed on Feb. 5, 2015, which in turn, claims the benefit of priority of U.S. Provisional Patent Application Ser. No. 61/937,133 filed on Feb. 7, 2014, the contents of each of which are relied upon and incorporated herein by reference in their entireties.

This application claims the benefit of priority under 35 U.S.C. § 119 of U.S. Provisional Application Ser. No. 61/937,133 filed on Feb. 7, 2014, the content of which is relied upon and incorporated herein by reference in its entirety.

FIELD

The present disclosure relates to glass-laminate structures and, more particularly, to methods of shaping laminated glass structures.

BACKGROUND

Laminated glass structures may be used as components in the fabrication of various appliances, automobile components and architectural structures or electronic devices. For example, laminated glass structures may be incorporated as cover glass for various end products such as refrigerators, backsplashes, decorative glazing or televisions. However, it may be difficult to cut or otherwise shape the laminated glass structures in the field (e.g., at the place of installation) without causing fractures in the glass layer given limitations of the hand tools that might be used and properties of the laminated glass structures. For example, many hand tools used by contractors are not typically used to cut glass, plastic or adhesives. Accordingly, there is a need for methods of field shaping laminated glass structures using these hand tools to minimize the effort and cost of glass laminate use and installation.

SUMMARY

One technique to improve the mechanical reliability of flexible glass is to laminate, or bond, the flexible glass to one or more laminate materials or substrates of unique structures. Flexible glass may be glass having a thickness of 300 microns or less, including but not limited to, 300, 275, 250, 225, 200, 190, 180, 170, 160, 150, 140, 130, 120, 110, 100, 90, 80, 70, 60, 50, 40, 30, 20, or 10 microns. Additionally, the flexible glass may have a thickness in a range of from 100 to 200 microns. Depending on the mechanical strength and impact resistance requirements of a laminated glass structure, as well as the expected bending stresses and direction of the intended application, a laminated glass structure can be designed to meet various mechanical requirements. When used properly, the laminated glass structures can offer improved mechanical reliability and impact resistance performance over unlaminated flexible glass.

Once the laminated glass structures are formed, it can become necessary to cut or otherwise shape them in the field (e.g., at an installation location or some other location away from the lamination location), for example, once exact dimensions for the installation are determined. To this end, methods of field shaping the laminated glass structures are described herein where power hand tools are used to effectively cut the laminated glass structures to desired shapes while minimizing damage to the flexible glass sufficient to diminish edge strength below a predetermined amount and/or initiate radial or circumferential crack propagation. As used herein the terms "hand tools" and "handheld power tools" are meant to encompass normally portable equipment that would be used by a wood-worker at a job site (i.e., in the field), and is meant to include, by way of example and not limitation, routers, drill motors, dremel tools, zip saws, tile saws, circular saws, jig saws, band saws, table saws, and radial arm saws. The goal is to cause as little a reduction in the properties of the laminate with respect to strength, flexibility, esthetics, and overall life cycle of the part. Because the laminated glass structures can be shaped in the field, they may be used in much the same manner as typical carpentry materials. For example, the laminated glass structures can be used as a backsplash for kitchen installation, wherein a larger laminated glass structure can be cut down, in the field, to the particular size of the wall on which the backsplash is desired.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, a method of field shaping a preform laminated glass structure comprises:

providing the preform laminated glass structure comprising a flexible glass sheet having a thickness of no greater than about 0.3 mm laminated to a non-glass substrate by an adhesive material; and field cutting the preform laminated glass structure using a handheld power tool thereby forming a shaped laminated glass structure;

wherein a glass edge strength of a cut edge of the shaped laminated glass structure is at least about 20 MPa.

According to a second aspect, there is provided the method of aspect 1, wherein the step of field cutting comprises cutting the preform laminated glass structure at an installation location for the shaped laminated glass structure.

According to a third aspect, there is provided the method of aspect 1 or aspect 2, further comprising supporting the preformed laminated glass structure on a support surface such that the non-glass substrate is located between the flexible glass sheet and the support surface.

According to a fourth aspect, there is provided the method of any one of aspects 1-3, wherein the handheld power tool comprises a cutting tool applying a compressive stress to the flexible glass sheet during the step of field cutting.

According to a fifth aspect, there is provided the method of any one of aspects 1-4, further comprising applying a mask along an intended cutting line on a surface of the flexible glass sheet.

According to a sixth aspect, there is provided the method of any one of aspects 1-5, further comprising applying a fluid to a surface of the flexible glass sheet.

According to a seventh aspect, there is provided the method of any one of aspects 1-6, further comprising sanding the shaped laminated glass structure along the cut edge using a sand paper.

According to an eighth aspect, there is provided the method of aspect 7, wherein the sand paper has an ISO/FEPA Grit designation of at least 180 or greater.

According to a ninth aspect, there is provided the method of any one of aspects 1-8, wherein the handheld power tool is a router comprising a compression router bit, a chip breaker bit, or a downward fluted bit that puts the glass surface in compression.

According to a tenth aspect, there is provided the method of any one of aspects 1-8, wherein the handheld power tool is a tile saw.

According to an eleventh aspect, there is provided the method of any one of aspects 1-8, wherein the handheld power tool is a table saw.

According to a twelfth aspect, there is provided the method of any one of aspects 1-11, wherein the power tool includes a cutting tool having an abrasive coating of abrasive particles having an average diameter of at most about ¼ of a thickness of the flexible glass sheet.

According to a thirteenth aspect, a method of field shaping a preform laminated glass structure comprises:

providing the preform laminated glass structure comprising a flexible glass sheet having a thickness of no greater than about 0.3 mm laminated to a non-glass substrate by an adhesive material;

supporting the preform laminated glass structure on a support surface such that the non-glass substrate is located between the flexible glass sheet and the support surface; and field cutting the preform laminated glass structure using a cutting tool of a handheld power tool in a climb cut orientation applying a compressive force to the flexible glass sheet thereby forming a shaped laminated glass structure.

According to a fourteenth aspect, there is provided the method of aspect 13, wherein a glass edge strength of an cut edge of the shaped laminated glass structure is at least about 20 MPa.

According to a fifteenth aspect, there is provided the method of aspect 11 or aspect 12, wherein the step of field cutting comprises cutting the preform laminated glass structure at an installation location for the shaped laminated glass structure.

According to a sixteenth aspect, there is provided the method of any one of aspects 13-15, further comprising applying a mask along an intended cutting line on a surface of the flexible glass sheet.

According to a seventeenth aspect, there is provided the method of any one of aspects 13-16, further comprising applying a fluid to a surface of the flexible glass sheet.

According to an eighteenth aspect, there is provided the method of any one of aspects 13-17, further comprising sanding the shaped laminated glass structure along the cut edge using a sand paper.

According to a nineteenth aspect, there is provided the method of aspect 18, wherein the sand paper has an ISO/FEPA grit designation of at least 180.

According to a twentieth aspect, there is provided the method of any one of aspects 13-19, wherein the handheld power tool is a router comprising a compression router bit, a chip breaker bit, or a downward fluted bit that puts the glass surface in compression.

According to a twenty first aspect, there is provided the method of any one of aspects 13-19, wherein the handheld power tool is a tile saw.

According to a twenty second aspect, there is provided the method of any one of aspects 13-19, wherein the handheld power tool is a table saw.

According to a twenty third aspect, there is provided the method of aspect 21, wherein the tile saw includes a diamond powder-coated cutting wheel.

According to a twenty-fourth aspect, there is provided the method of any one of the aspects 13-23, wherein the handheld power tool includes a cutting tool having an abrasive coating of abrasive particles having an average diameter of at most about ¼ of a thickness of the flexible glass sheet.

According to a twenty fifth aspect, there is provided the method of any one of aspects 13-19, or 22, wherein the power tool is a table saw utilizing a carbide toothed blade, having between 60 and 90 teeth, for example 80 teeth, with 3 pitch settings (left, right, and center alignment).

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
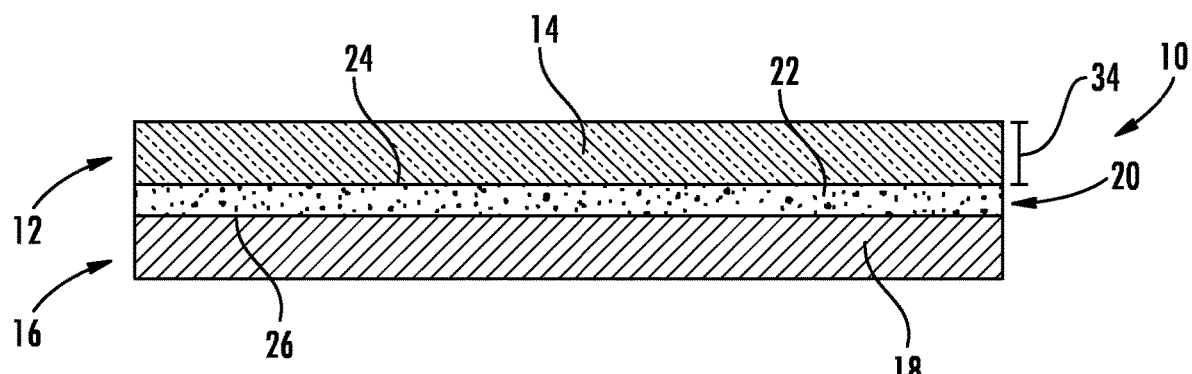
FIG. 1 illustrates a cross-sectional view of one embodiment of a laminated glass structure in accordance with aspects of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Although glass is an inherently strong material, its strength and mechanical reliability is a function of its surface defect or flaw size density distribution and the cumulative exposure of stress to the material over time. During an entire product life cycle, a laminated glass structure may be subjected to various kinds of static and dynamic mechanical stresses. Embodiments described herein generally relate to methods of shaping (e.g., cutting) laminated glass structures in the field, such as at an installation location that is remote from the location where the lamination took place. Particular examples discussed herein relate to laminated glass structures where the non-glass substrate is a polymer and/or metal or metal alloy, such as stainless steel, aluminum, nickel, magnesium, brass, bronze, titanium, tungsten, copper, cast iron or a noble metal.

Referring to FIG. 1, a cross-sectional view of an exemplary laminated glass structure 10 is illustrated. The laminated glass structure 10 includes a flexible glass layer 12 that is formed of a flexible glass sheet 14 and a non-glass substrate layer 16 that is laminated to the flexible glass layer 12. The non-glass substrate layer 16 is formed of a non-glass substrate 18, such as polymer, wood or wood-based products such as chipboard, particleboard, fiberboard, and cardboard, hardboard, or low pressure laminate, high pressure laminate, or veneer, or metal or metal alloys such as stainless steel, copper, nickel, brass, bronze, titanium, tungsten, cast iron, aluminum, ceramic, composite, or another polymer or rigid material or combinations of these materials.

The non-glass substrate 18 may be formed using a polymer material, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

An adhesive layer 20 may be formed of an adhesive material 22 that may be used to laminate the flexible glass layer 12 to the non-glass substrate layer 16 at the interfaces between their respective broad surfaces 24 and 26. The adhesive material 22 may be a non-adhesive interlayer, an adhesive, a sheet or film of adhesive, a liquid adhesive, a powder adhesive, a pressure sensitive adhesive, an ultraviolet-light curable adhesive, a thermally curable adhesive, or other similar adhesive or combination thereof. The adhesive material 22 may assist in attaching the flexible glass 14 to the non-glass substrate 18 during lamination. Some examples of low temperature adhesive materials include Norland 68 cured by UV, Flexcon V29TT, 3M OCA 8211, 8212, 8146,and 8172 (bonded by pressure at room temperature), 3M 4905, OptiClear® adhesive, silicones, acrylates, optically clear adhesives, encaptulant material, polyurethane polyvinylbutyrates, ethylenevinylacetates, ionomers, and wood glues. Typical graphic adhesives such as Graphicmount and Facemount may also be used (as available from LexJet Corporation, located in Sarasota Fla., for example). Some examples of higher temperature adhesive materials include DuPont SentryGlas, DuPont PV 5411, Japan World Corporation material FAS and polyvinyl butyral resin. The adhesive layer 20 may be thin, having a thickness less than or equal to about 1000 μm, including less than or equal to about 500 µm, about 250 µm, less than or equal to about 50 µm, less than or equal to 40 µm, less than or equal to about 25 µm, or between about 0.1 mm and about 5 mm. The adhesives may also contain other functional components such as color, decoration, heat or UV resistance, AR filtration etc. The adhesive material 22 may be optically clear on cure, or may otherwise be opaque. In embodiments where the adhesive material 22 is a sheet or film of adhesive, the adhesive material 22 may have a decorative pattern or design visible through the thickness of the flexible glass, as shown in FIG. 2.

Figure 2:
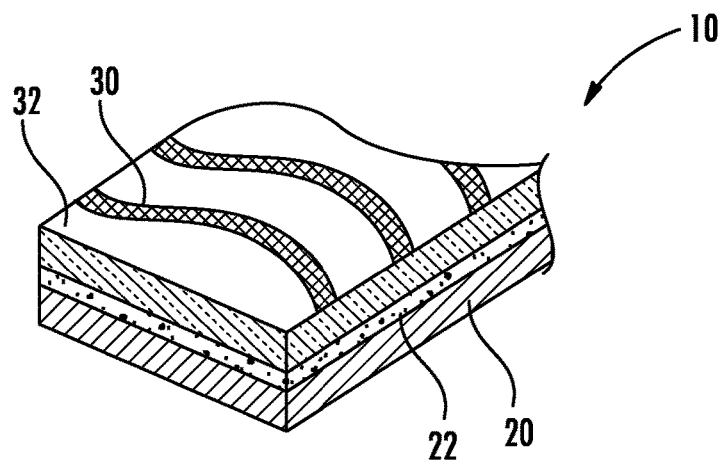
FIG. 2 depicts a cross-sectional view of the laminated glass structure of FIG. 1 with a decorative pattern located on one or more of the glass surface or upon a film located between the substrate and the flexible glass layer in accordance with aspects of the disclosure.

In FIG. 2, the laminated glass structure 10 includes an adhesive layer 20 formed of a sheet or film of adhesive material 22. The adhesive material 22 has a pattern of stripes 30 that are visible from an outer surface 32 of the flexible glass layer 12. In some embodiments, the non-glass substrate layer may provide a decorative pattern and/or the decorative pattern may be provided on either surface of the flexible glass sheet 14. In some embodiments, the decorative pattern may be provided on multiple layers 12, 16 and/or 20. Some air bubbles may become entrained in the laminated glass structure during or after lamination, but air bubbles having a diameter of equal to or less than 100 µm may not affect the impact resistance of the laminated glass structure. Formation of air bubbles may be reduced by use of a vacuum system or application of pressure to a surface of the structure during lamination. In other embodiments, the flexible glass layer 12 may be laminated without adhesive.

The flexible glass sheet 14 may have a thickness 34 of about 0.3 mm or less including but not limited to thicknesses of, for example, about 0.01-0.05 mm, about 0.05-0.1 mm, about 0.1-0.15 mm, about 0.15-0.3 mm, about 0.100 to about 0.200 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass sheet 14 may be formed of glass, a glass ceramic, a ceramic material or composites thereof. A fusion process (e.g., downdraw process) that forms high quality flexible glass sheets can be used in a variety of devices and one such application is flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw and slot draw methods. Additionally, the flexible glass sheet 14 may also contain anti-microbial properties by using a chemical composition for the glass including an Ag ion concentration on the surface in the range greater than 0 to 0.047 µg/cm$^2$, further described in U.S. Patent Application Publication No. 2012/0034435 A1. The flexible glass 14 may also be coated with a glaze composed of silver, or otherwise doped with silver ions, to gain the desired anti-microbial properties, as further described in U.S. Patent Application Publication No. 2011/0081542 A1. Additionally, the flexible glass 14 may have a molar composition of 50% $SiO_2$, 25% CaO, and 25% $Na_2O$ to achieve the desired anti-microbial effects.

Once the flexible glass sheet 14 is formed, it may be laminated to the non-glass substrate 18 using a variety of apparatus and processes. Some examples include sheet-to-sheet lamination where pressure and/or heat are used to bond the flexible glass sheet 14 to the non-glass substrate 18, for example, using the adhesive material 22. As another example, a roll-to-sheet or roll-to-roll lamination method may be used where; again, pressure is used to bond a continuous ribbon of flexible glass sheet 14 from a supply roll to a non-glass substrate 18 either as a continuous substrate from a supply roll or a plurality of individual substrates. While it may be possible to form the laminated glass structure to a final, desired dimension, it may be the case that some type of shaping (e.g., cutting) of the laminated glass structure will be needed after the laminated glass structure is formed. In these instances, the laminated glass structure may be referred to as a preform laminated glass structure in that the preform laminated glass structure will undergo final processing in the field, for example, at an installation site to desired dimensions.

Without wishing to be bound by theory, one difficulty that may be encountered during cutting of the laminated glass structures to a predetermined dimension in the field is maintaining an acceptable edge quality of the flexible glass sheet 14. Edge quality of the flexible glass sheet 14 is related to edge strength and the possibility of initiation/formation of undesirable or unintended cracks and fractures in the flexible glass sheet 14. In some embodiments, it may be desirable to maintain a predetermined edge strength in the flexible glass sheet 14 after cutting. For example, maintaining an edge strength in the flexible glass sheet 14 of at least about 20 MPa can allow the flexible glass sheet 14 of the laminated glass structure 10 to survive end use conditions, such as handling and installation, without forming cracks and fractures in the flexible glass sheet 14. However, specialized tools for cutting the flexible glass sheet 14 are generally not available in the field (e.g., at the location of installation). It has been found that, under predetermined conditions, power hand tools, such as tile saws and routers and table saws, which are not typically used for cutting at least one of the materials in the laminated glass structure can be used to cut the laminated glass structures 10 (e.g., flexible glass sheet 14, adhesive material 22 and non-glass substrate 18), and with a subsequent edge finishing process maintain a predetermined edge strength of at least about 20 MPa in the flexible glass sheets 14. Edge finishing of the laminated glass structures 10 using sand paper of greater grit size may be employed to further improve the glass edge quality and strength.

Figure 3:
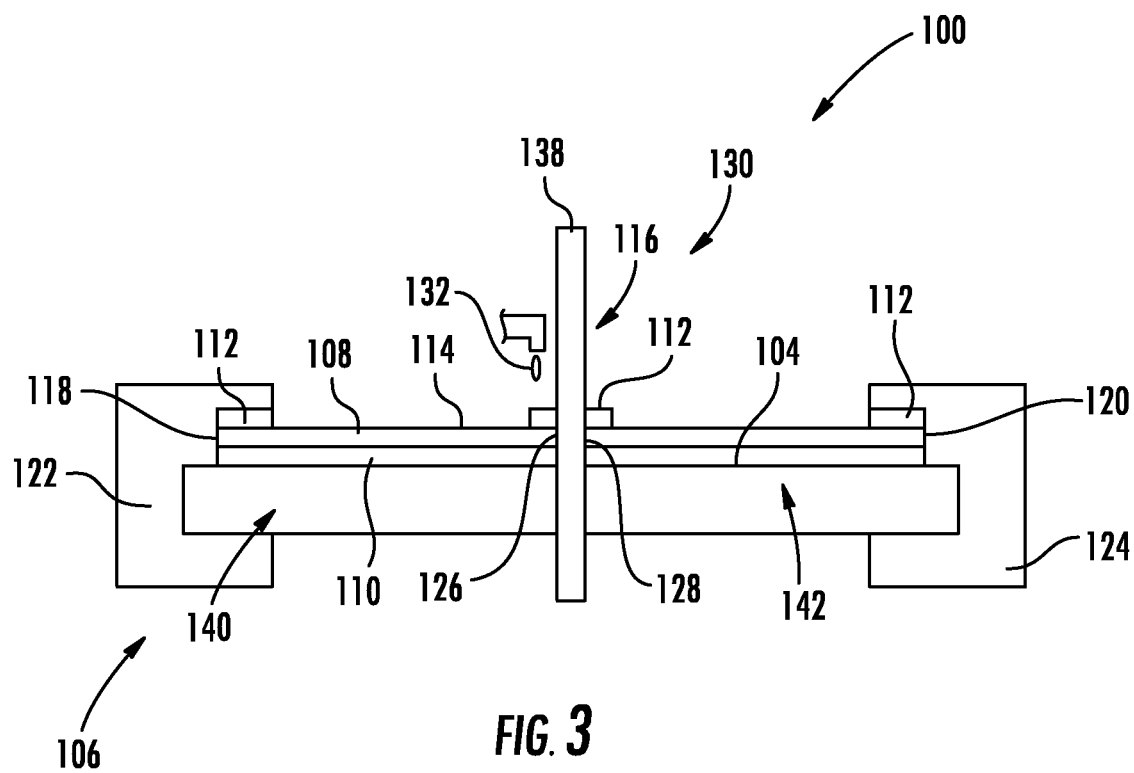
FIG. 3 depicts a diagrammatic end view of a system and method for field shaping a laminated glass structure in accordance with aspects of the disclosure.

Referring to FIG. 3, a method 100 of field shaping a preform laminated glass structure 102 using a handheld tile saw 130 is illustrated. The preform laminated glass structure 102 may be supported on a surface 104 of a support structure 106, such as a workbench or table at an installation site, with a flexible glass sheet 108 of the preform laminated glass structure 102 facing away from the surface 104 of the support structure 106 and a non-glass substrate 110 sandwiched between the flexible glass sheet 108 and the support structure 106. A mask 112 (e.g., a tape) may be applied to a broad surface 114 of the flexible glass sheet 108. As an example, the mask 112 may be strips of tape applied along an intended cutting line 116 and at outer edges 118 and 120 where clamps 122 and 124 may be applied to support the preform laminated glass structure 102 and inhibit vibration. The mask 112 can be used to protect the surface 114 and also to inhibit bonding and collection of glass chips along the cut edges 126 and 128 and on the surface 114. Where the mask 112 is applied can depend on a number of factors, such as the cutting tool used, the pattern being cut, where the preform laminated glass structure 102 is being supported and the final (or useful) laminated glass structure versus the scrap. In some embodiments, each piece of the preform laminated glass structure 102 may be useful, while in other embodiments, one or more pieces of the preform laminated glass structure 102 may be scrap. In some embodiments, both of the scrap portion and useful portion of the preform laminated glass structure 102 may be supported (e.g., using the clamps 122 and 124).

A liquid or fluid, for example, a cutting fluid 132, such as water or other liquid solution, may be supplied to the surface 114 of the preform laminated glass structure 102 from a fluid supply (e.g., a water tap). The cutting fluid 132 may be applied through the handheld tile saw 130 or by any other suitable method, such as from a container or using a hose. The cutting fluid 132 can reduce friction between a cutting edge 136 of a cutting wheel 138 of the handheld tile saw 130, while also protecting the cut edges 126 and 128 and surface 114 of the preform laminated glass structure 102 from scratches and contamination caused by the deposit of abrasive particles or chips made during the machining process. On the other hand, dry cutting is beneficial in some instances.

Figure 4A:
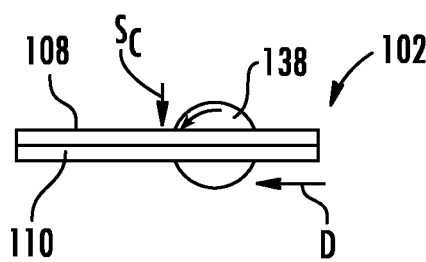
FIG. 4A illustrates a cutting wheel of a tile saw for use in the method of FIG. 3 operating in a climb cut orientation in accordance with aspects of the disclosure.
Figure 4B:
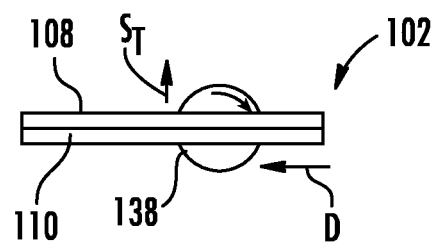
FIG. 4B illustrates a cutting wheel of a tile saw operating in an anti-climb cut direction in accordance with aspects of the disclosure.

A cut may be initiated by the operator using the handheld tile saw 130 (e.g., such as commercially available from Ryobi Limited) while the cutting fluid 132 is applied. The handheld tile saw may be power operated, for example, using an electrical outlet or battery. The cutting wheel 138 may be operated in a climb cut orientation. As used herein, a "climb cut orientation" refers to the cutting tool applying a compressive stress Sc to the flexible glass sheet during a cutting operation moving in direction D (FIG. 4A) as opposed to an "anti-climb cut operation," which applies a tensile stress St to the flexible glass sheet using the cutting tool moving in direction D (FIG. 4B). Use of the climb cut can avoid fracturing the flexible glass layer of the laminated glass structure 102. The feed or cutting rate can be dependent on the preform laminated glass structure 102 (glass thickness, type and thickness of the non-glass substrate and adhesive). For example, the cutting rate may be about four feet per minute. Real time observation by the operator may be used to adjust the cutting rate. The cutting wheel 138 may be any suitable type, such as a four inch diamond powder-coated cutting wheel (e.g., commercially available from Ryobi Limited). The abrasive (e.g., diamond) grit size, or diameter of the abrasive particles, can play a significant role in quality of the cut. The surface finish quality, smoothness, and amount of chipping can all be affected by the grit size. The finer the grit, the smoother the cut will be and the rougher the grit, the coarser the resulting cut. Once a cut is initiated, the cut may be made the entire length of the intended cutting line 116 to inhibit or reduce cracking of the flexible glass sheet 108 and to produce cut laminated glass structures 140 and 142. Once the cut is complete, the mask 112 can be removed and the cut laminated glass structures 140 and 142 can be rinsed and dried.

Figure 5:
FIG. 5 illustrates a cut edge of a laminated glass structure formed in accordance with the method of FIG. 3 before finishing in accordance with aspects of the disclosure.
Figure 6:
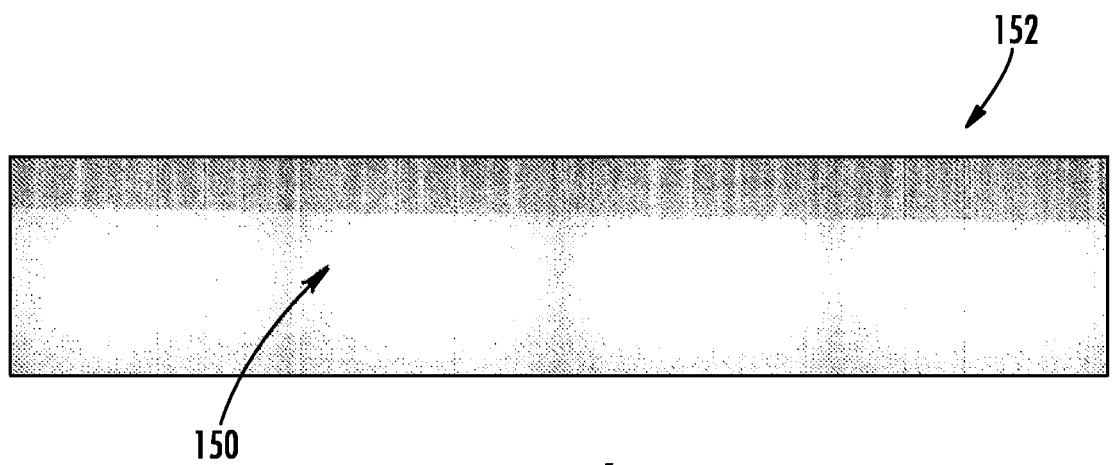
FIG. 6 illustrates the cut edge of FIG. 5 after finishing in accordance with aspects of the disclosure.
Figure 7:
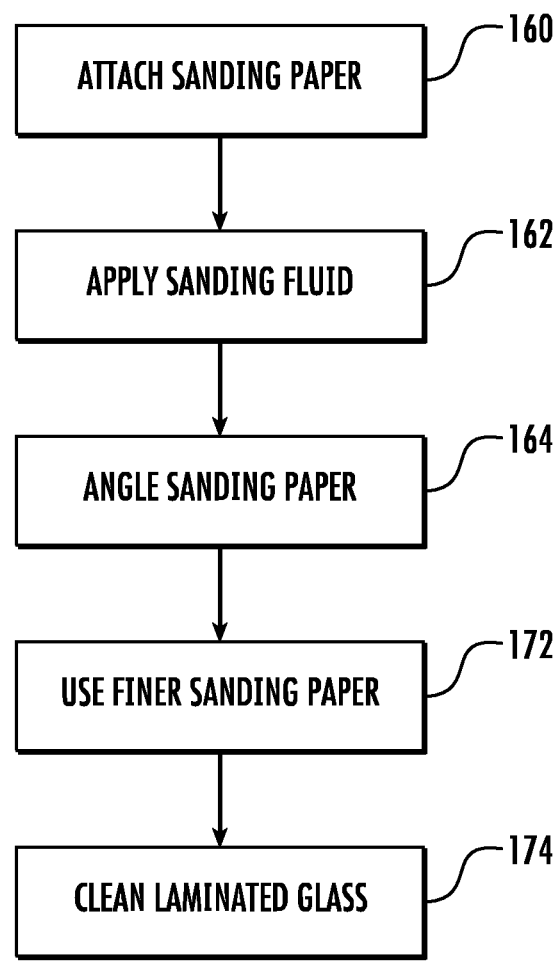
FIG. 7 illustrates a method of finishing a cut edge of a laminated glass structure in accordance with aspects of the disclosure.
Figure 8A:
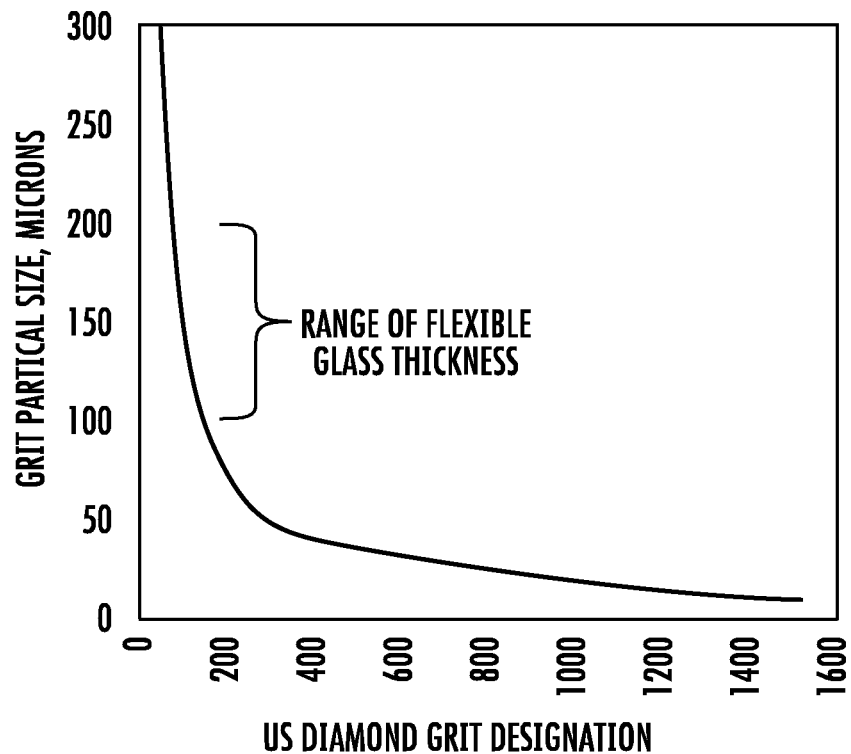
FIG. 8A illustrates a chart of grit particle size versus US diamond grit designation.
Figure 8B:
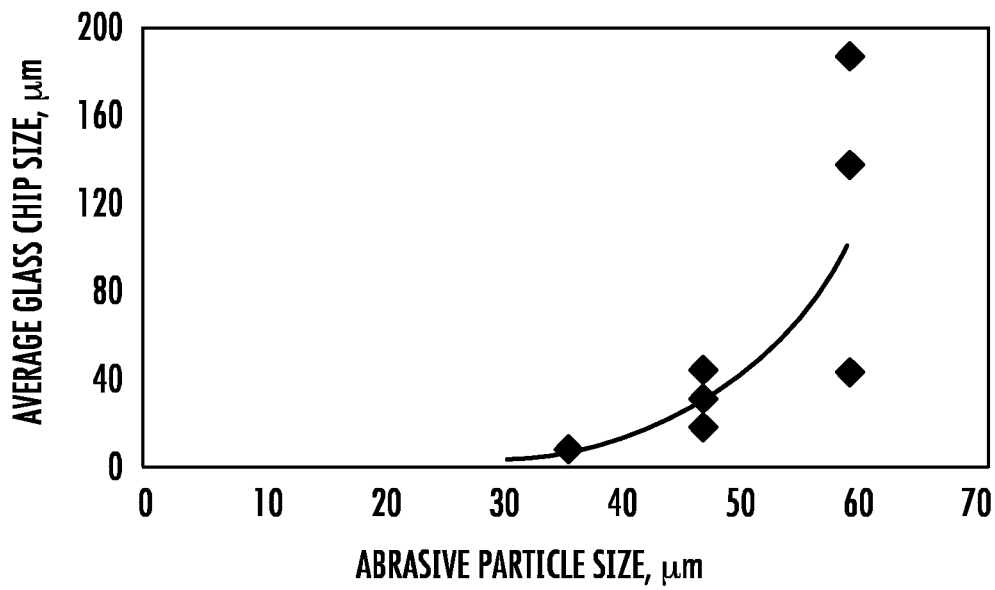
FIG. 8B illustrates a chart of average glass chip size versus abrasive particle size.
Figure 8C:
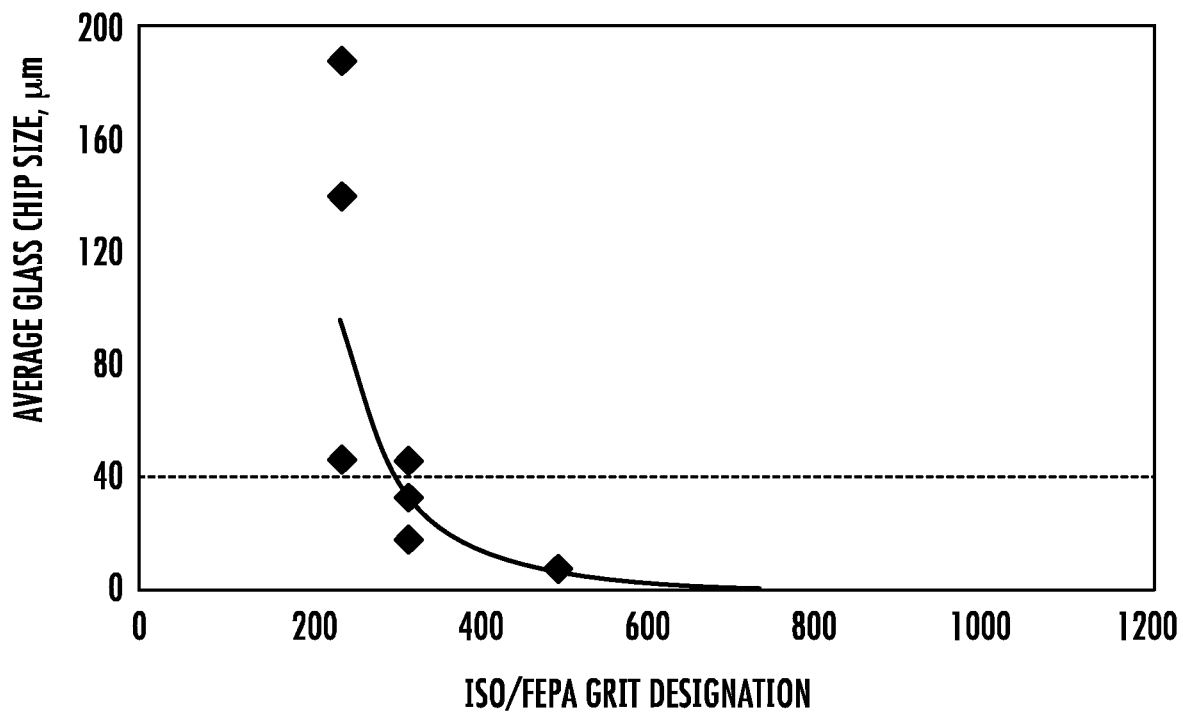
FIG. 8C illustrates a chart of average glass chip size versus ISO/FEPA grit designation.

FIG. 5 illustrates a cut edge 150 of a flexible glass sheet 152 (e.g., cut in the manner described above). Due to the cutting process, rounded and/or straight chips 154 may be created along the cut edge 150. In some embodiments, a finishing operation or multiple finishing operations may be desired to remove or reduce the size of the chips 154 and create a smoother or cleaner cut edge 150 (FIG. 6). Referring to FIG. 7, at step 160, a suitable sand paper (e.g., AlOx, SiC; at least 180 grit) is attached to a sanding block. Referring briefly to FIGS. 8A-8C, charts comparing grit size to flexible glass sheet thickness and glass chip sizes are illustrated. Power finishing may also be achieved using several commonly utilized tools such as belt sanders and orbital sanders, for example. To minimize glass edge chipping during either a cutting or finishing operation, the grit size used should be much smaller than the thickness of the flexible glass sheet to produce any chip sizes less than a predetermined depth (e.g., about 20 μm or less). In some embodiments, grit size designations of 180 or finer, for example, 220 grit, 400 grit, 600 grit and 800 grit, or finer may be used. A shown in FIG. 8A, when a flexible glass thickness of 100 to 200 microns is used, a grit size of 600 has a grit particle size of less than 50 microns, i.e., about 30 microns and much smaller than the thickness of the flexible glass. For example, when a flexible glass thickness of 200 microns is used, a grit size of 180 or more has a grit particle size of less than 200 microns, and can successfully be used as a starting point for finishing the glass edge. As an additional example, using abrasive particles during the cutting process having an average diameter of less than about ¼, such as less than about ⅕ of the thickness of the flexible glass sheet can significantly reduce edge chipping and obtain glass edge strengths of about 20 MPa or more, for example 50 MPa or more. As shown in FIGS. 8B and 8C, an abrasive grit particle size of 30 microns (from ISO/FEPA Grit Designation 600) produces negligible average glass chip sizes. In some instances, an ISO/FEPA Grit Desingnation of 180 ore more can produce negligible average glass chip sizes. Finishing angles are also beneficially selected to successfully preserve the attributes of the cut and finished laminate structure. Andgles from 23 degrees to 87 degrees can be effective. In some instances angles of 70-85 degrees are desired.

Figure 9:
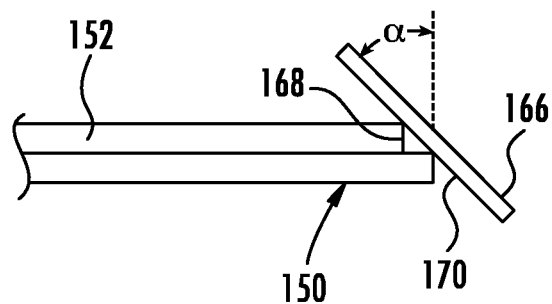
FIG. 9 illustrates a method of sanding a cut edge of a laminated glass structure in accordance with aspects of the disclosure.

Referring back to FIG. 7, at step 162, a fluid, for example, a sanding fluid such as water may be applied along the cut edge 150. At step 164, the sand paper and sanding block may be held at an angle to the cut edge 150 (i.e., at an angle to a plane transverse to the broad surface of the flexible glass sheet). FIG. 9 illustrates the sand paper 166 contacting the cut edge 150 at angle α to the cut edge 150 (e.g., from about five to about 85 degrees, for example, from about five to about 45 degrees, for example 45 degrees). Such an arrangement can produce an edge 168 of the flexible glass sheet 152 offset inwardly of an edge 170 of the non-glass substrate 110 and can provide some protection for the edge 168, for example, during handling by extending the edge 170 beyond the edge 168. Referring back to FIG. 7, once the initial sanding operation is complete using the 600 grit sand paper, finer grit sand paper (800 grit) may be used at the same angle α for a finishing operation at step 172. According to other examples, a range of grit sizes from 180 to 800 may be successively used, for example, an initial 180 grit sandpaper may be used, and then one or more of 220 grit, 400 grit, 600 grit, 800 grit, or finer. At step 174, the laminated glass structure may be rinsed and dried. Vibratory, belt or disc sanders may be used in a fashion similar to that described above.

Figure 10:
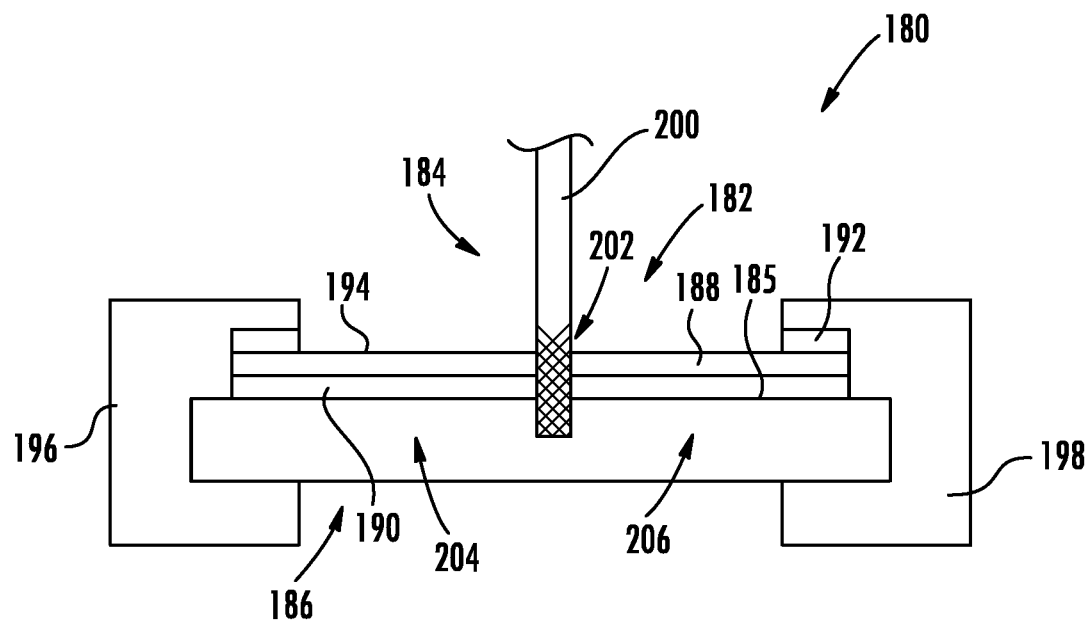
FIG. 10 depicts a diagrammatic end view of a system and method for field shaping a laminated glass structure in accordance with aspects of the disclosure.

Referring now to FIG. 10, another method 180 of field shaping a preform laminated glass structure 182 using a handheld router 184 is illustrated. The preform laminated glass structure 182 may be supported on a surface 185 of a support structure 186 with a flexible glass sheet 188 of the preform laminated glass structure 182 facing away from the surface 185 of the support structure 186 and a non-glass substrate 190 sandwiched between the flexible glass sheet 188 and the support structure 186. A mask 192 may be applied to a broad surface 194 along with clamps 196 and 198, as described above. For a non-linear cut, a pattern may be drawn on the mask 192, including any center cut marking illustrating the center of the cut (or where routing will begin for an internal cut).

A cut may be initiated by the operator using the handheld router 184 (e.g., such as commercially available from Porter-Cable Corporation). The handheld router 184 may be power operated, for example, using an electrical outlet or battery.

A router bit 200 may be operated in a climb cut orientation using a compression bit. The feed or cutting rate can be dependent on the preform laminated glass structure 182 (glass thickness, type and thickness of the non-glass substrate and adhesive). For example, the cutting rate may be between about 10 inches per minute and about eight feet per minute. According to other aspects, the cutting rate may be between about 1 inch per minute and about 10 inches per minute. Real time observation may be used to adjust the cutting rate. The router bit 200 may be any suitable compression type, such as a diamond coated or carbide compression cutting bit (e.g., commercially available from Harvey Tool, or SGS) having counteracting flute geometries that compress the glass material inwardly. Router bits may also be downward fluted bits having various coatings such as TiN, TiCN, ZrCr and others. Additionally, chip breaker bits may be used as well. Once a cut is initiated, the cut may be made along the entire length of the intended cutting line 202 to inhibit or reduce cracking of the flexible glass sheet 188 and to produce cut laminated glass structures 204 and 206. Once the cut is complete, the mask 192 can be removed and the cut laminated glass structures 204 and 206 can be rinsed and dried.

Figure 11:
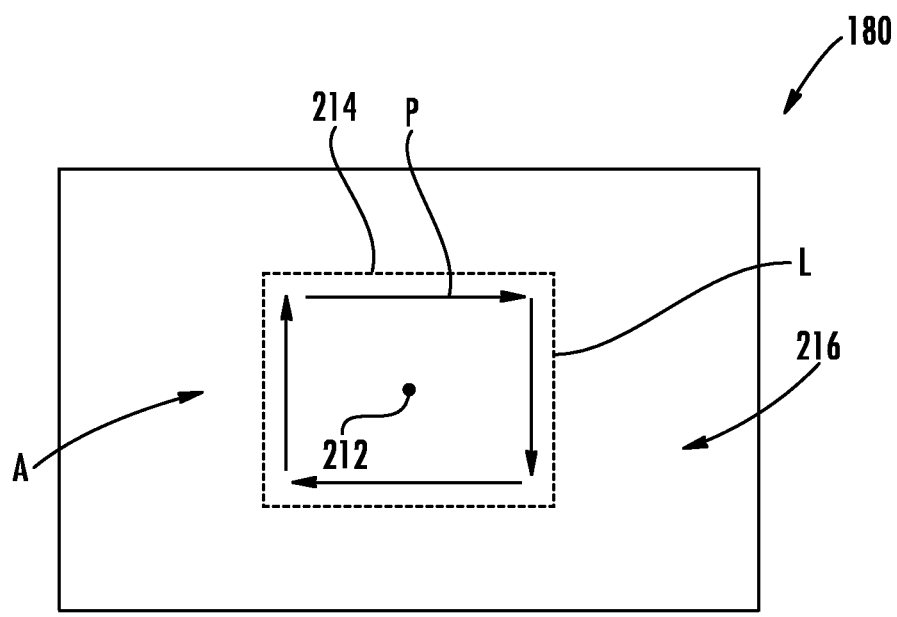
FIG. 11 illustrates a method of cutting a laminated glass structure along an internal cut line using a router in accordance with aspects of the disclosure.

Router cuts can be made unmasked and without a cutting fluid. In some embodiments, a masking (e.g., with tape) may be provided to minimize damaging the flexible glass sheet by kerf material. Router cuts may also follow a specified tool path to provide the climb cut orientation (depending on the flute direction of the router bit), compression and to minimize glass edge and substrate damage. Router bits that do not apply compression to the flexible glass layer burring the initial plunge or puncture of the laminated glass structure 210 can result in significant glass fracturing. For example, referring to FIG. 11, a router cut along cut line L of a preform laminated glass structure 210 may begin by piercing the preform laminated glass structure 210, within an area A to be cut and discarded at a location 212 entirely through its thickness. A clockwise cutting path P may be followed by the compression router bit, which applies a compressive force at the cut edge 214 of the useful laminated glass structure portion 216. In some embodiments, a template may be used to guide the operator when using the handheld router. As the size of the cut out increases, the area A of the preform laminated glass structure 210 may be secured to stabilize or prevent the area A from excessively vibrating and creating stresses that can lead to glass chipping and/or cracking.

Table I, below, illustrates various cutting parameters for shaping laminated glass structures. Table I is exemplary and not meant to be exhaustive as other cutting tools may be employed and due to variation in equipment from manufacturer to manufacturer.

TABLE I

|  | Cutting | | | Finishing | | |
|---|---|---|---|---|---|---|
|  | Router | Tile Saw | Table Saw | Router | Tile Saw | Table Saw |
| Cutter | Router and/or Mill Bit | Diamond Coated Blade | Carbide Tip Blade |  |  |  |
| Style | Compression/Down Flute and Chip Breaker Bits | Can Vary with Laminate Composition | Cross Cut Can Vary with Laminate Composition |  |  |  |
| Diameters | Variable depending upon Laminate stack-up and Radius requirements | Variable depending upon Laminate stack-up | 10" |  |  |  |
| Speed | 5,000-30,000 rpm | Can Vary with Laminate Composition | 3500-6000 rpm |  |  |  |
| Cutting Rate | 10 in. to 8 ft./min. | ≅4 ft./min. | 4 ft.-7 ft./minute |  |  |  |
| Pattern | Traditional Straight Cut, or Center Pierce - cut out to edge, trim perimeter | Traditional Straight cut | Traditional Straight cut |  |  |  |
| Type of Cut | Compression or Climb Cut | Compression or Climb Cut | Compression or Climb Cut |  |  |  |
| Straight, Holes, Non-linear | Straight, Holes, Non-linear | Straight Some Linear Internal Shapes (size dependent) | Straight Some Linear Internal Shapes (size dependent) |  |  |  |
| Wet or Dry Cut | Wet or Dry | Wet Only | Dry Only |  |  |  |
| Orbital Sander |  |  |  | Y | Y | Y |
| Manual Sand |  |  |  | Y | Y | Y |
| Belt Sander |  |  |  | Y | Y | Y |
| Coated Compliant Ball Sander |  |  |  | Y | Y | Y |
| Guinevere System Sander |  |  |  | Y | Y | Y |
| Paper |  |  |  | SiC or AlOx | SiC or AlOx | SiC or AlOx |
| Grit Size |  |  |  | 240-800 | 240-800 | 240-800 |
| Finishing Direction |  |  |  | Linear/Orbital/ Circumferential | Linear/Orbital/ Circumferential | Linear/Orbital/ Circumferential |
| Time to Finish 12 inches |  |  |  | 1-10 minutes Substrate Dependent | 1-10 minutes Substrate Dependent | 1-10 minutes Substrate Dependent |
| Wet or Dry Finishing |  |  |  | Wet/Dry Substrate Dependent | Wet/Dry Substrate Dependent | Wet/Dry Substrate Dependent |

The systems and methods of field shaping laminated glass structures described above allow for use of hand held and semi-automated cutting and finishing tools, such as tile saws, diamond saws, table saws, routers, wire saws, orbital sanders and other grinding and polishing tools (e.g., Dremel® rotary tools, RotoZip® saws, orbital sanders, and belt sanders) with minimal damage while maintaining edge strengths of the flexible glass sheets of at least about 20 MPa, for example about 40 MPa, 50 MPa, 60 MPa, 70 MPa, 80 MPa, 90 MPa, 100 MPa, or higher, for example. The laminated glass structures may be masked to prevent incidental scratching of the flexible glass sheets by the tools and inhibit attachment of glass particles to the flexible glass sheet. Glass chips as large as 900 to 1200 microns, and in other examples as large as 900 to 3000 µm can be created during cutting which can be finished with a secondary one or two-step finishing process to obtain glass chip sizes less than 10 microns, such as less than five microns in depth. Use of climb cutting orientations apply a compressive force to the flexible glass sheet during cutting using the cutting tool which allows for edge strengths of the flexible glass sheets to be maintained above 20 MPa, for example, about 40 MPa, 50 MPa, 60 MPa, 70 MPa, 80 MPa, 90 MPa, 100 MPa, or higher, for example. For example, for diamond blade cutting, the rotation of the cutting wheel should be in the climb direction, contacting the flexible glass sheet first as the cutting wheel is rotated. For router cutting, compression bits with downwardly turned flutes may be utilized.

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A method of field shaping a laminated glass structure, the method comprising:
   providing the laminated glass structure comprising a flexible glass sheet having a thickness of no greater than about 0.3 mm laminated to a non-glass substrate by an adhesive material;
   supporting the laminated glass structure on a support surface such that the non-glass substrate is located between the flexible glass sheet and the support surface;
   field cutting the laminated glass structure using a cutting tool of a handheld power tool in a climb cut orientation applying a compressive force to a surface of the flexible glass sheet that is opposite the non-glass substrate in a direction of movement of the handheld power tool thereby forming a shaped laminated glass structure;
   finishing a cut edge of the shaped laminated glass structures to form a finished cut edge
   wherein said finishing uses abrasive particles having an average diameter of less than about ¼ of the thickness of the flexible glass sheet and
   wherein a glass edge strength of the finished cut edge of the shaped laminated glass structure is at least about 20 MPa.

2. The method of claim 1, wherein a glass edge strength of a cut edge of the shaped laminated glass structure is at least about 50 MPa.

3. The method of claim 1, wherein the step of field cutting comprises cutting the laminated glass structure at an installation location for the shaped laminated glass structure.

4. The method of claim 1, further comprising applying a mask along an intended cutting line on a surface of the flexible glass sheet.

5. The method of claim 1, further comprising applying a fluid to a surface of the flexible glass sheet.

6. The method of claim 1, wherein the handheld power tool is a router comprising a compression router bit.

7. The method of claim 1, wherein the handheld power tool is a tile saw.

8. The method of claim 1, wherein the handheld power tool includes a table saw.

9. A method of field shaping a laminated glass structure, the method comprising:
   providing the laminated glass structure comprising a flexible glass sheet having a thickness of no greater than about 0.3 mm laminated to a non-glass substrate by an adhesive material;
   supporting the laminated glass structure on a support surface such that the non-glass substrate is located between the flexible glass sheet and the support surface;
   field cutting the laminated glass structure using a cutting tool of a handheld power tool in a climb cut orientation applying a compressive force to a surface of the flexible glass sheet that is opposite the non-glass substrate in a direction of movement of the handheld power tool thereby forming a shaped laminated glass structure
   wherein the handheld power tool includes a cutting tool having an abrasive coating of abrasive particles having an average diameter of less than about ¼ of the thickness of the flexible glass sheet and
   wherein a glass edge strength of a cut edge of the shaped laminated glass structure is at least about 20 MPa.

10. The method of claim 9, further comprising applying a mask along an intended cutting line on a surface of the flexible glass sheet.

11. The method of claim 9, further comprising applying a fluid to a surface of the flexible glass sheet.

12. The method of claim 9, wherein the glass edge strength of the cut edge of the shaped laminated glass structure is at least about 50 MPa.

13. The method of claim 9, wherein the step of field cutting comprises cutting the laminated glass structure at an installation location for the shaped laminated glass structure.

14. The method of claim 9, wherein the handheld power tool is a tile saw.

15. The method of claim 14, wherein the tile saw includes a cutting wheel coated with diamond powder.

* * * * *